US011978482B2

(12) United States Patent
Johnson et al.

(10) Patent No.: US 11,978,482 B2
(45) Date of Patent: May 7, 2024

(54) DATA STORAGE DEVICE WITH CLOSED LOOP EXTENDED PARK MODE DURING SPIN DOWN OPERATION

(71) Applicant: Western Digital Technologies, Inc., San Jose, CA (US)

(72) Inventors: Brian Johnson, Laguna Hills, CA (US); Jaesoo Byoun, Irvine, CA (US); Gaku Ikedo, Fujisawa (JP); Hideaki Ito, Fujisawa (JP); Naoyuki Kagami, Fujisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 47 days.

(21) Appl. No.: 17/577,300

(22) Filed: Jan. 17, 2022

(65) Prior Publication Data
US 2023/0230616 A1 Jul. 20, 2023

(51) Int. Cl.
*G11B 19/20* (2006.01)
*G11B 5/55* (2006.01)
*G11B 19/22* (2006.01)
*G11B 19/26* (2006.01)

(52) U.S. Cl.
CPC .......... *G11B 19/2063* (2013.01); *G11B 19/22* (2013.01); *G11B 19/26* (2013.01)

(58) Field of Classification Search
CPC ..... G11B 5/5521; G11B 5/5526; G11B 5/553; G11B 5/5547; G11B 5/556; G11B 5/59605; G11B 5/5569; G11B 19/2018; G11B 19/2027; G11B 19/2009; G11B 19/2036; G05B 11/28; G05B 3/18; G05B 3/183; G05B 2219/42237

USPC .................. 360/99.09, 74.1, 264.7
See application file for complete search history.

(56) References Cited

U.S. PATENT DOCUMENTS

| 5,838,515 | A | 11/1998 | Mortazavi et al. |
|---|---|---|---|
| 6,160,368 | A | 12/2000 | Plutowski |
| 6,549,361 | B1 | 4/2003 | Bennett et al. |
| 6,577,465 | B1 | 6/2003 | Bennett et al. |
| 6,906,485 | B2 | 1/2005 | Hussein |
| 6,967,458 | B1 * | 11/2005 | Bennett .................. G11B 19/20 318/560 |
| 6,970,319 | B1 | 11/2005 | Bennett et al. |
| 6,972,539 | B1 | 12/2005 | Codilian et al. |
| 7,158,329 | B1 | 1/2007 | Ryan |

(Continued)

OTHER PUBLICATIONS

Khov et al., "On-Line Parameter Estimation of PMSM in Open Loop and Closed Loop", IEEE International Conference on Industrial Technology, 2009, 6 pages.

(Continued)

*Primary Examiner* — Nabil Z Hindi
(74) *Attorney, Agent, or Firm* — Neugeboren O'Dowd PC

(57) ABSTRACT

A data storage device has a closed loop extended park mode during spin down operation. A data storage device comprises a spindle motor configured to rotate one or more disks, and one or more processing devices. The one or more processing devices are configured to determine a value of current that is discharged from the spindle motor over time during a spin down of the spindle motor, and control a braking duty cycle for braking the spindle motor during the spin down such that the value of current discharged from the spindle motor over time does not exceed a selected current limit.

17 Claims, 7 Drawing Sheets

(56) References Cited

U.S. PATENT DOCUMENTS

| | | |
|---|---|---|
| 9,093,105 B2 * | 7/2015 | Ferris .................... H02P 25/034 |
| 9,142,225 B1 | 9/2015 | Chen et al. |
| 9,245,577 B1 | 1/2016 | Byoun |
| 9,390,749 B2 | 7/2016 | Ferris et al. |
| 9,396,751 B1 | 7/2016 | Byoun et al. |
| 9,437,231 B1 | 9/2016 | Ferris et al. |
| 9,564,162 B1 | 2/2017 | Byoun et al. |
| 9,620,160 B1 | 4/2017 | Byoun et al. |
| 9,666,224 B1 | 5/2017 | Byoun |
| 9,972,348 B1 | 5/2018 | Ferris et al. |
| 10,013,032 B1 | 7/2018 | Ferris et al. |
| 10,109,308 B1 | 10/2018 | Johnson et al. |
| 10,176,835 B1 | 1/2019 | Byoun et al. |
| 10,176,840 B1 | 1/2019 | Johnson et al. |
| 10,242,698 B1 | 3/2019 | Byoun et al. |
| 10,242,706 B1 | 3/2019 | Johnson et al. |
| 10,504,553 B1 | 12/2019 | Byoun |
| 10,714,133 B1 | 7/2020 | Johnson et al. |
| 11,081,988 B1 | 8/2021 | Byoun |
| 2003/0175018 A1 | 9/2003 | Heydt et al. |
| 2010/0246051 A1 | 9/2010 | Galbiati et al. |
| 2014/0063641 A1 | 3/2014 | Galbiati |
| 2019/0006964 A1 | 1/2019 | Kurosawa et al. |

OTHER PUBLICATIONS

ISA/KR, International Search Report and Written Opinion issued in PCT/US2022/029813, Oct. 12, 2022, pp. 10.

* cited by examiner

DATA STORAGE DEVICE WITH CLOSED LOOP EXTENDED PARK MODE DURING SPIN DOWN OPERATION

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors. The servo sectors comprise head positioning information (e.g., a track address) which is read by the head and processed by a servo control system to control the actuator arm as it seeks from track to track.

FIG. 1 shows a prior art disk format 2 as comprising a plurality of radially spaced, concentric servo tracks 4 defined by servo wedges $6_0$-$6_N$ recorded around the circumference of each servo track. A plurality of concentric data tracks is defined relative to the servo tracks 4, wherein the data tracks may have the same or a different radial density (e.g., tracks per inch (TPI)) than the servo tracks 6. Each servo wedge $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., N and Q servo bursts), which are recorded with a predetermined phase relative to one another and relative to the servo track centerlines. The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

SUMMARY

Various aspects of the present disclosure provide a data storage device with a closed loop extended park mode during spin down operation of a spindle motor, that allows for a smoother spin down that may promote the reliability of the data storage device, and may reduce or eliminate discontinuities and changes in the switching frequency that cause acoustic noise. A data storage device of this disclosure may substantially reduce or eliminate events in which the current through the spindle motor exceeds the current limit of the motor. In addition, aspects of this disclosure may provide less reverse current to the host, and load-balancing of current through switches of a VCM, as well as reduced spindle spin down time, in various examples.

According to one aspect of the present disclosure, a data storage device comprises a spindle motor configured to rotate one or more disks, and one or more processing devices. The one or more processing devices are configured to: determine a value of current that is discharged from the spindle motor over time during a spin down of the spindle motor, and control a braking duty cycle for braking the spindle motor during the spin down such that the value of current discharged from the spindle motor over time does not exceed a selected current limit.

In another aspect of this disclosure, a method comprises determining, by one or more processing devices, a value of current that is discharged from a spindle motor of a data storage device over time during a spin down of the spindle motor. The method further comprises controlling, by the one or more processing devices, a braking duty cycle for braking the spindle motor during the spin down such that the value of current discharged from the spindle motor over time does not exceed a selected current limit.

In another aspect of this disclosure, one or more processing devices comprise means for determining a value of current that is discharged from a spindle motor of a data storage device over time during a spin down of the spindle motor; and means for controlling a braking duty cycle for braking the spindle motor during the spin down such that the value of current discharged from the spindle motor over time does not exceed a selected current limit.

Various further aspects are depicted in the accompanying figures and described below, and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure and are not limiting in scope.

DETAILED DESCRIPTION

Figure 1:
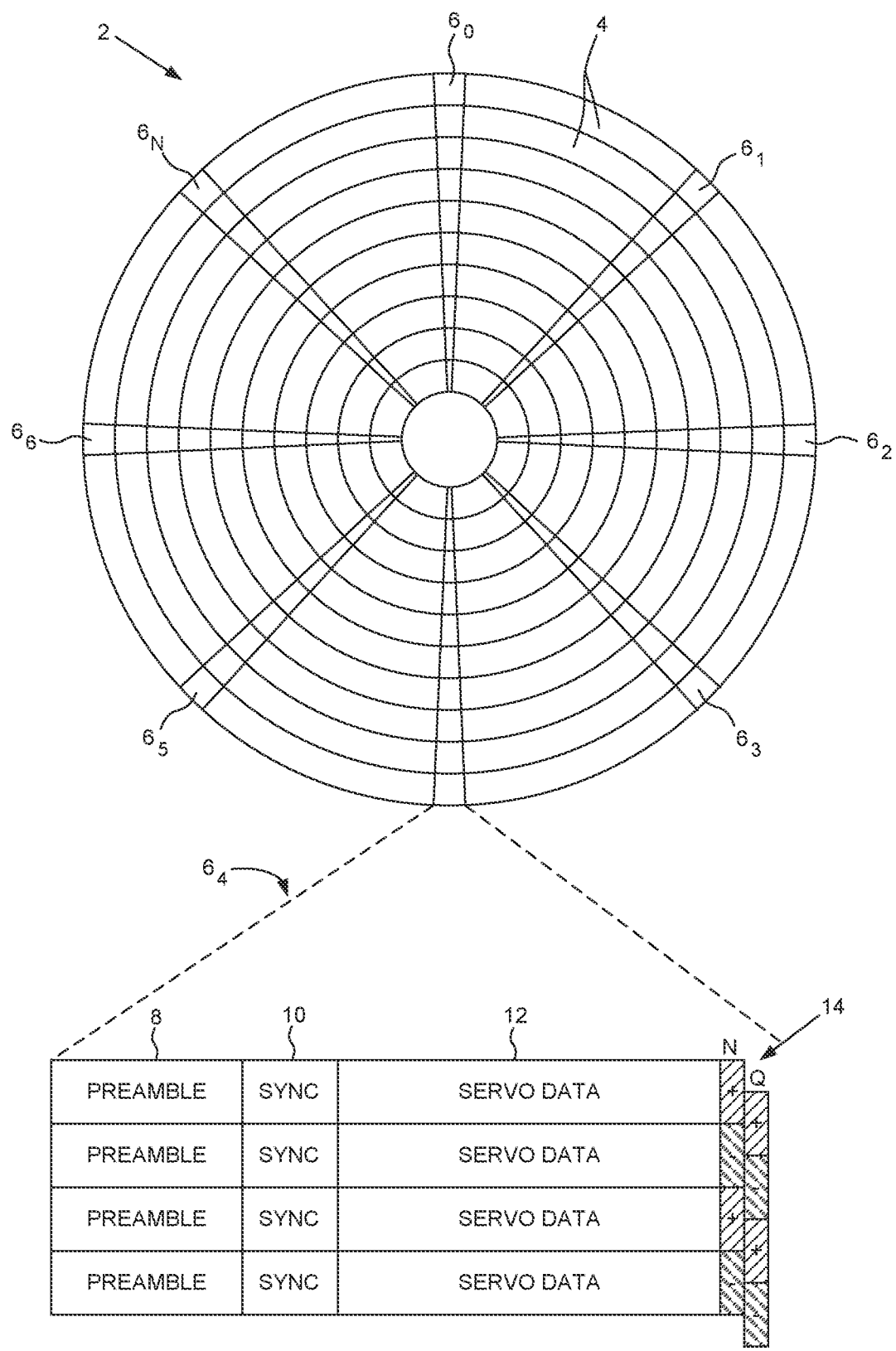
FIG. 1 shows a prior art disk format comprising a plurality of radially spaced, concentric servo tracks defined by servo wedges recorded around the circumference of each servo track.
Figure 2:
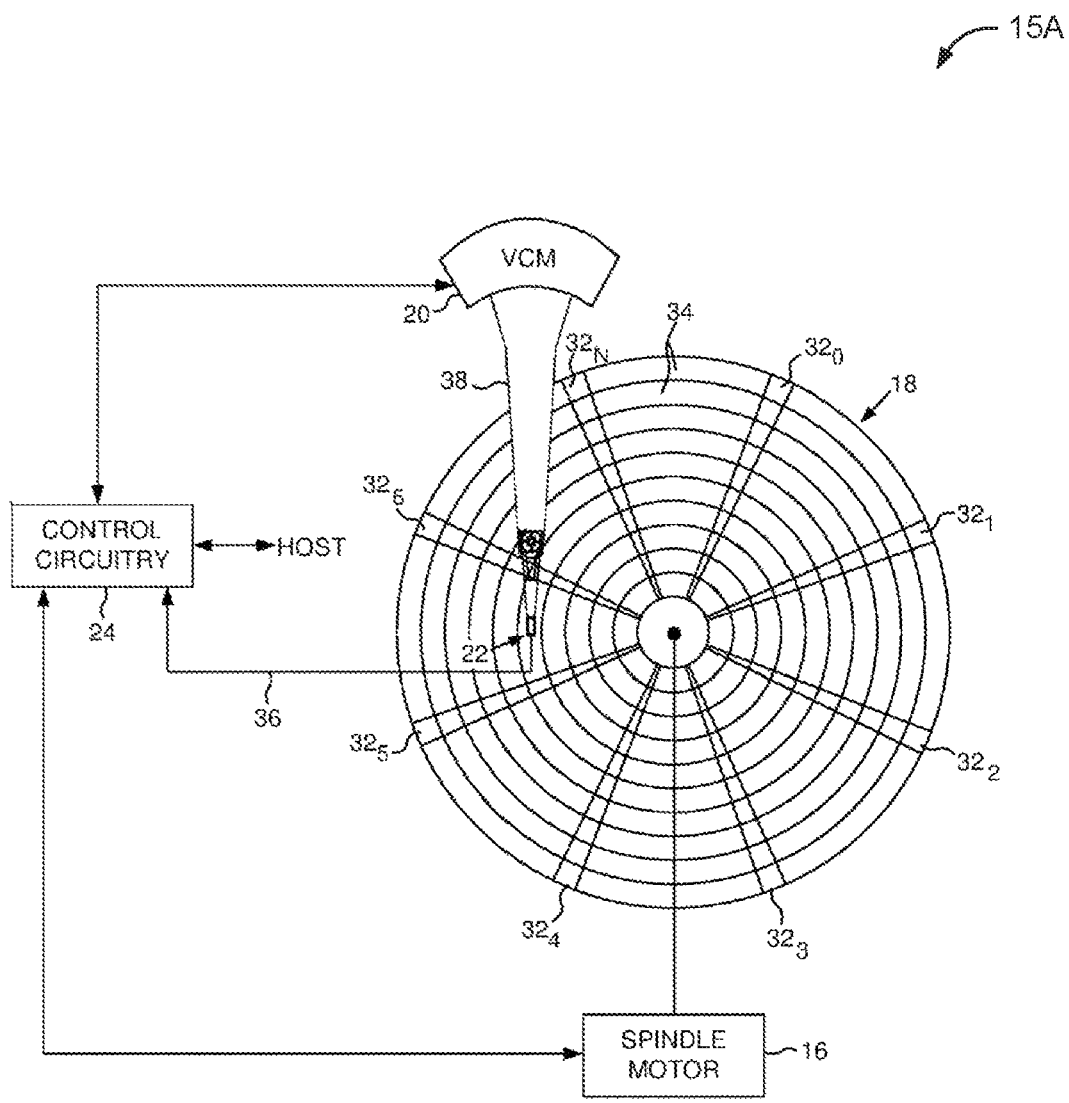
FIG. 2 illustrates a conceptual block diagram of a data storage device in the form of a disk drive, in accordance with aspects of the present disclosure.

FIG. 2 illustrates a conceptual block diagram of a data storage device in the form of a disk drive 15A, in accordance with aspects of the present disclosure. Disk drive 15A comprises a spindle motor 16 configured to rotate a disk 18, a voice coil motor (VCM) 20 configured to actuate a head 22 over the disk 18, and control circuitry 24. In various examples, disk drive 15A may be considered to perform functions and tasks and execute processes and methods and techniques in terms of its novel control circuitry 24 executing computer-readable instructions of software code or firmware code of this disclosure, for example.

In the example of FIG. 2, the disk 18 comprises a plurality of servo sectors $32_0$-$32_N$ that define a plurality of servo tracks 34, wherein data tracks are defined relative to the servo tracks at the same or different radial density. The control circuitry 24 processes a read signal 36 emanating from the head 22 to demodulate the servo sectors $32_0$-$32_N$ and generate a position error signal (PES) representing an error between the actual position of the head 22 and a target position relative to a target track. A servo control system in the control circuitry 24 filters the PES using a suitable compensation filter to generate a control signal applied to the VCM 20 which rotates an actuator arm 38 about a pivot in order to actuate the head 22 radially over the disk 18 in a direction that reduces the PES. The servo sectors $32_0$-$32_N$ may comprise any suitable head position information, such as a track address for coarse positioning and servo bursts for fine positioning. The servo bursts may comprise any suitable pattern, such as an amplitude-based servo pattern or a phase-based servo pattern.

Figure 3:
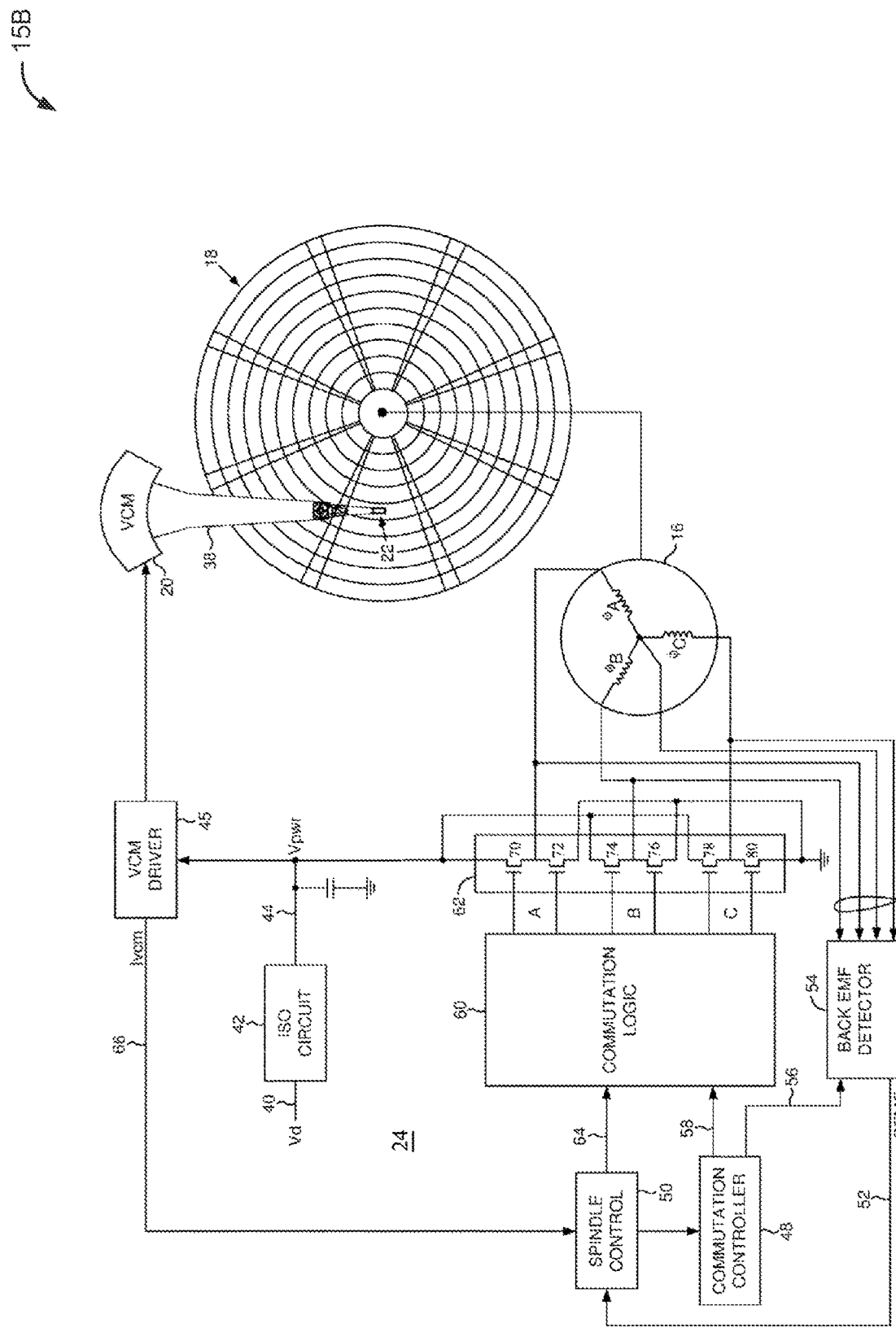
FIG. 3 is a conceptual diagram of the data storage device of FIG. 2 illustrating control circuitry in more detail, in accordance with aspects of the present disclosure.

FIG. 3 is a conceptual diagram of the data storage device of FIG. 2 illustrating control circuitry 24 in more detail, in accordance with aspects of the present disclosure. Disk drive 15B receives a supply voltage 40 (Vd) from a host which passes through an isolation (ISO) circuit 42 to become a power voltage 44 (Vpwr) used to power disk drive 15B, including to power a VCM driver 45 for controlling the VCM 20 that actuates the head 22 over the disk 18. The power voltage 44 (Vpwr) also powers spindle control circuitry configured to commutate the spindle motor 16 in order to rotate the disk 18. A back electromotive force (back EMF) voltage 46 generated by the windings of the spindle motor 16 may be processed in order to drive the commutation sequence of a commutation controller 48. A spindle control block 50 may process a back EMF signal 52, which may be a square wave representing the back EMF zero-crossings as detected by a back EMF detector 54, in various examples. The commutation controller 48 may generate a control signal 56 which configures the back EMF detector 54 to detect the zero-crossing of the back EMF voltage 46 generated by each winding as the disk rotates. The commutation controller 48 may also generate a control signal 58 applied to commutation logic block 60.

In the example of FIG. 3, commutation logic block 60 may be configured by the control signal 58 to control the state of switches 62 in order to drive the windings with power voltage 40. Switches 62 may be implemented, for example, as high-side field effect transistors (FETs) 70, 74 and 78, and low-side FETs 72, 76 and 80. Commutation logic block 60 may operate in any suitable manner, such as by driving the switches 62 as linear amplifiers that apply continuous-time sinusoidal voltages to the windings. In other examples, commutation logic block 60 may drive the switches 62 using pulse width modulation (PWM), such as using square wave PWM, trapezoidal PWM, or sinusoidal PWM. Regardless as to how the windings are driven, the commutation controller 48 may generate the control signal 58 so that the windings are commutated at the correct periods, thereby generating the desired rotating magnetic field that causes the spindle motor to rotate. In various examples, spindle control block 50 may generate a spindle control signal 64 that controls the effective amplitude of the periodic driving voltage applied to the windings (continuous or PWM), thereby controlling the speed of the spindle motor 16.

During a spin down mode, low-side FETs 72, 76 and 80 may be grounded, thereby grounding the windings of the spindle motor 16 and causing a braking torque to be applied to the spindle motor 16. Back EMF voltage 46 continues to be generated during spin down mode in proportion to the spin rate of the motor. Back EMF voltage 46 causes a current to be generated (e.g., as back EMF divided by resistance) that may be discharged through low-side FETs 72, 76 and 80. Back EMF voltage 46 may also be applied to VCM 20, which may be used to actuate head 22 to and against the outer diameter (OD) of the disk and which may involve parking head 22.

Spindle motor 16 may have a nominal maximum current rating. In one illustrative example, the maximum current rating of spindle motor 16 may be 3 amps. In other examples, a spindle motor may have any of a wide variety of maximum current ratings higher or lower than 3 amps. Thus, while spinning down the spindle motor 16, and particularly on higher back EMF motors, the current generated by the back EMF voltage 46 and discharged through low-side FETS 72, 76 and 80 may exceed the maximum current rating of spindle motor 16, unless precautionary methods are implemented to prevent such exceeding of the maximum current rating. Control circuitry 24 may prevent generation of a potentially damaging overcurrent while braking motor 16.

Some typical prior systems address this issue by use of an "open loop extended park" mode. In this mode, a fixed boost brake system (BBS) duty cycle of 97% braking (less than 100% full on braking) is used. This means that 97% of the time is spent braking the motor, and 3% of the time is spent coasting (or tri-stating) the motor. If the current through low-side FETs 72, 76, 80 exceeds, threatens to exceed, or approaches exceeding the current limit, known as a current limit event, or an "$I_{limit}$ event", control circuitry 24 may stop braking for some fixed period of off time ($t_{off}$) and enter a coast mode to allow the current to drop below the current limit, before control circuitry 24 may resume the duty cycle of 97% braking. During operation of such prior systems, and especially in the case of high back EMF motors, current limit events may occur for hundreds of milliseconds during the 97% brake duty cycle.

Dealing with overcurrent in this way during current limit events creates discontinuity and random switching frequencies, often at below 20 kHz, in the audible range. This results in substantial audible acoustic noise. Random switching frequencies at or around, for example, 5, 10, or 15 kHz may occur, all of which are in the audible range. Moreover, in prior open loop systems, once a current limit event has not occurred for more than a certain time, such as 8 ms for example, the extended park mode is exited, and full (100%) brake mode is entered. However, in such open loop systems, current limit events may nevertheless still occur, and the system may switch back into extended park mode, creating further discontinuity, mode switching and acoustic noise. Continually exceeding the current limit and switching modes in this manner is also problematic in that it causes more host reverse current.

Aspects of the present disclosure may address these and other problems of prior open loop systems by implementing closed loop control of the BBS duty cycle during extended park. Control circuitry 24 of this disclosure may sense current through the low-side FETs 72, 76, 80, or other types of low-side switches in other examples, and use this detected current in a feedback loop to adjust the BBS duty cycle to maintain the current through FETs 72, 76, 80 at or near a selected current limit, e.g., 2.9 amps in one example, for as long as possible. Control circuitry 24 may set the current limit for the spindle motor at a value below, but not very far below, and in some examples just below, the maximum current rating. If the maximum current rating is 3 amps, for example, control circuitry 24 may set the current limit ($I_{limit}$) at 2.9 amps, for example, or at 2.8, 2.85, 2.95, or other value at a relatively small margin below 3 amps, in various examples. Control circuitry 24 may set a lower braking percentage duty cycle that will not lead to current limit events even when the back EMF of the spindle motor is high. In this way, the maximum allowable current through the low-side FETs 72, 76, 80 can be nearly continually achieved, without noise and discontinuity, and obtaining a short spin down time; and in some examples, seeking to achieve the shortest spin down time possible or feasible. With elimination of constant current limit events and consequent mode switching, in various examples, the default switching frequency (e.g., 33 kHz in one example) may remain above the audible noise level and may not be subject to the random switching of prior open loop systems, among other advantages, in various examples.

As illustrative examples, control circuitry 24 incorporating aspects of the present disclosure may calculate an initial duty cycle of 85% or 90% braking, depending on the back EMF generated by spindle motor 16 during spin down. At an initial duty cycle of 85% or 90% braking, control circuitry 24 may maintain the current through low-side FETs 72,76, 80 at nearly 2.9 amps, in these examples. As the back EMF voltage begins to decay, control circuitry 24 may detect this decay of the back EMF, and respond by gradually ramping up the duty cycle toward 100% braking. This is in contrast to prior systems, in which a duty cycle of 97% braking is continually used without adjustment, other than for interrupts driven by current limit events, which typically leads to frequent or almost constant current limit events, and the accompanying discontinuity and noise.

Control circuitry 24 may thus determine a value of current discharged from spindle motor 16 during a spin down of spindle motor 16, in various examples. Control circuitry 24 may further set a braking duty cycle for braking spindle motor 16 during the spin down, such that the value of current discharged from spindle motor 16 does not exceed a selected current limit, in various examples.

Figure 4:
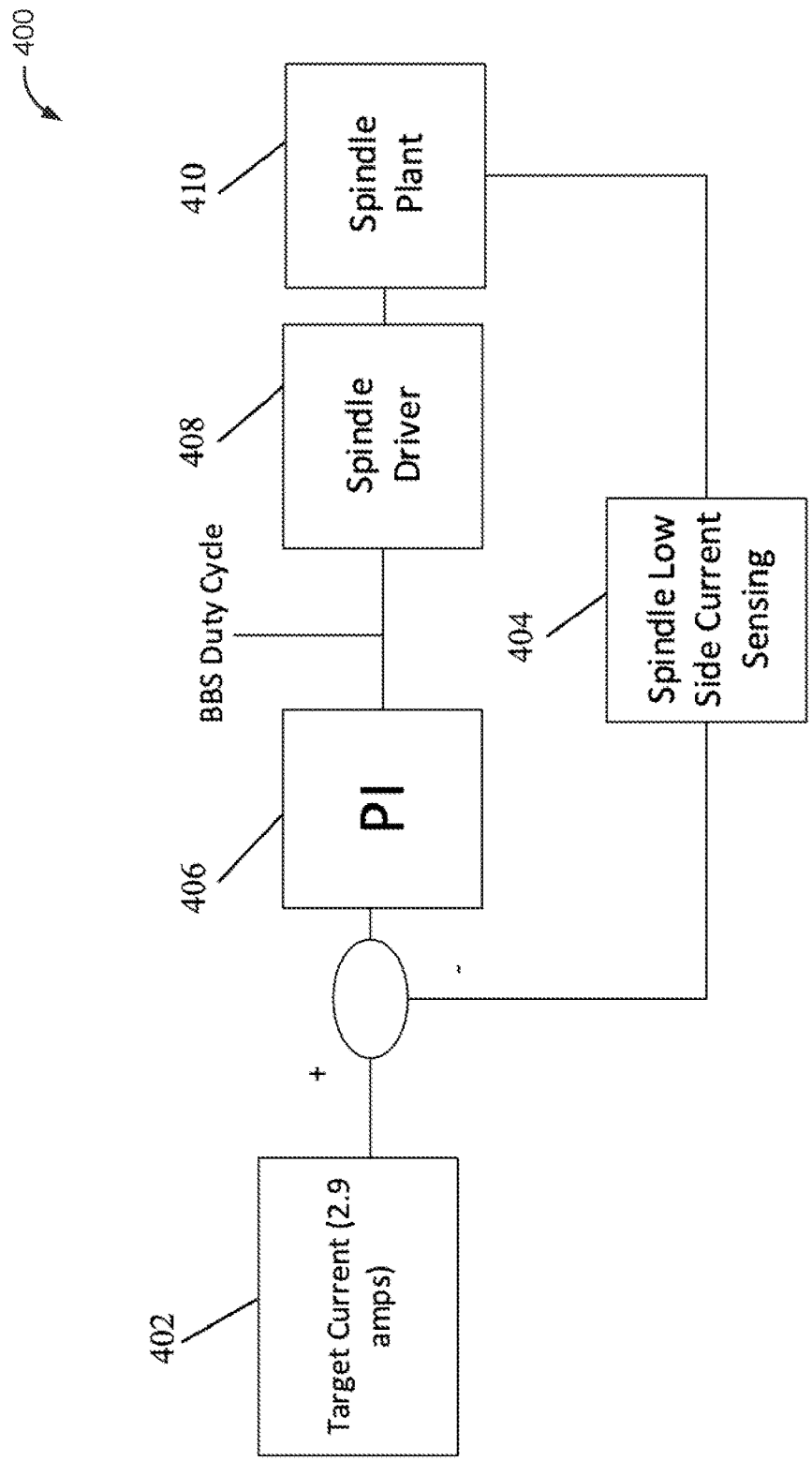
FIG. 4 illustrates a conceptual block diagram of a closed loop extended park control system, in accordance with aspects of the present disclosure.

FIG. 4 illustrates a conceptual block diagram of a closed loop extended park control system 400 in accordance with illustrative aspects of the present disclosure. System 400 may be comprised of portions of disk drive 15B, for example, including portions of control circuitry 24 executing computer-readable instructions of software code or firmware code. In order to maintain a target current 402 that is nearly equal to the selected current limit (e.g., 2.9 amps) through the low-side FETs 72, 76, 80, control circuitry 24 may use the sensed current 404 in the low-side FETs 72, 76, 80 in a feedback loop to adjust or modify the BBS duty cycle to maintain the current through FETs 72, 76, 80 at or near the selected current limit (e.g., 2.9 amps) for as long as possible, in this example. In particular, control circuitry 24 may use a proportional-integral controller (PI controller) 406 to make any needed adjustments or modifications to the duty cycle. Spindle driver 408, which may be comprised in control circuitry 24, and spindle plant 410, which may comprise spindle motor 16, may then be controlled in accordance with the adjusted or modified duty cycle, with control circuitry 24 iteratively using the sensed current 404 in low-side FETs 72, 76, 80 in the feedback loop to make further adjustments or modifications as needed.

Figure 5:
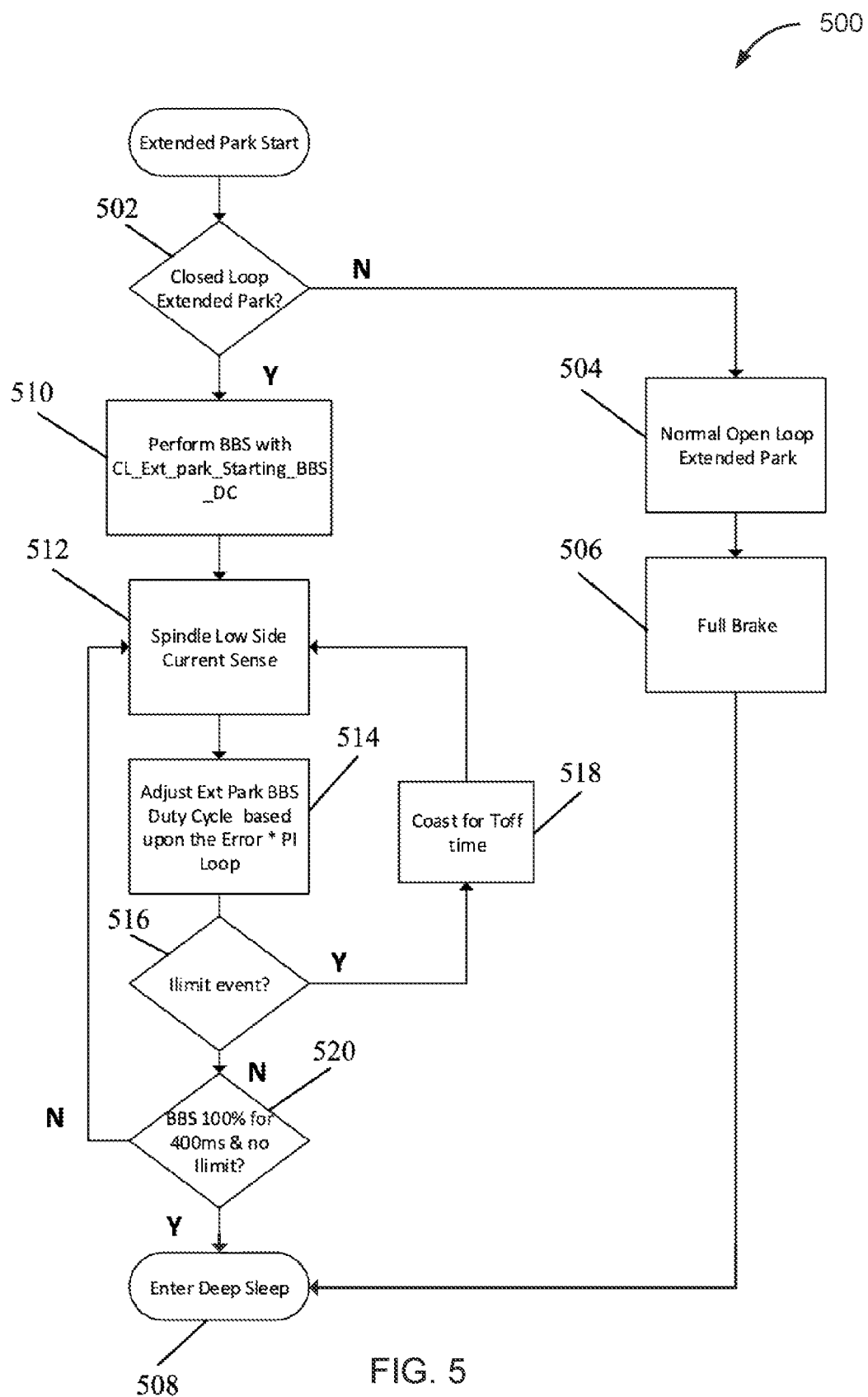
FIG. 5 illustrates a flowchart of a method for extended park control, in accordance with aspects of the present disclosure.

FIG. 5 illustrates a flowchart of a method 500 for extended park control according to aspects of the present disclosure. Control circuitry 24 may perform or execute method 500 to control disk drive 15B, for example, by implementing functions of electronic hardware, executing computer-readable instructions of software code or firmware code, or a combination thereof. If closed loop extended park mode is not to be performed (502-No), then normal open loop extended park mode (e.g., as in prior devices) may be performed (504) until a full brake is reached (506). The spindle motor control function of control circuitry 24 may then enter deep sleep (508).

If closed loop extended park mode is to be performed according to aspects of the present disclosure (502-Yes), control circuitry 24 may perform or implement BBS with closed loop extended park starting at BBS_DC (510). Control circuitry 24 may sense current through low-side FETs 72, 76, 80 of spindle motor 16 (512), and use PI controller 406 (as in FIG. 4) to adjust or modify the BBS duty cycle (514) such that the current through low-side FETs 72, 76, 80 is held to at or nearly the current limit. If a current limit event occurs (516-Yes), control circuitry 24 may control spindle motor 16 to enter coast mode for an off time $T_{off}$ (518) sufficient for the current through low-side FETs 72, 76, 80 to drop below the current limit. If a current limit event has not occurred (516-No), and the BBS duty cycle has been at 100% braking with no current limit events occurring for some specified time (e.g., 400 ms, 50 ms, 10 ms, in various examples) (520-Yes), then the spindle motor control function of control circuitry 24 may then enter deep sleep mode (508). If a current limit event has not occurred (516-No), but the BBS duty cycle has not yet been at 100% braking with no current limit events occurring for some specified time (e.g., 400 ms, 50 ms, 10 ms, in various examples) (520-No), then control circuitry 24 may return to sensing the current in the spindle motor low-side FET (512).

Figure 6A:
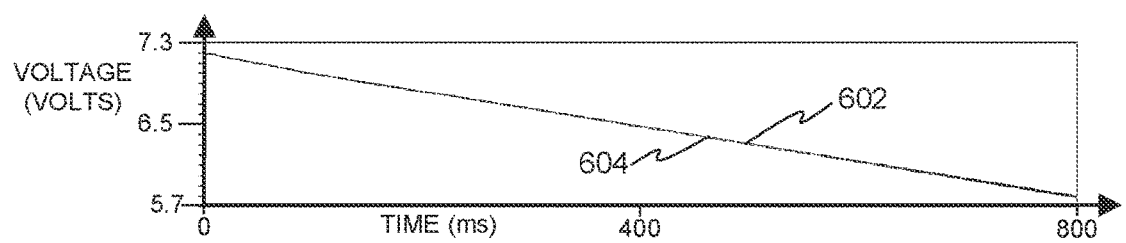
FIGS. 6A-6C illustrate graphs of a spin down simulation showing spin down time and current limit events, in accordance with aspects of the present disclosure.
Figure 6B:
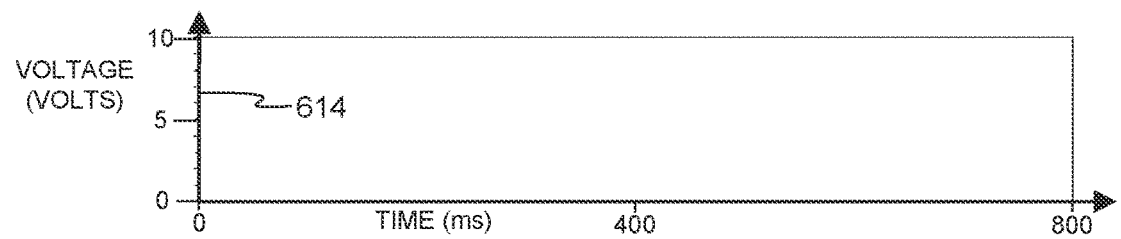
Figure 6C:
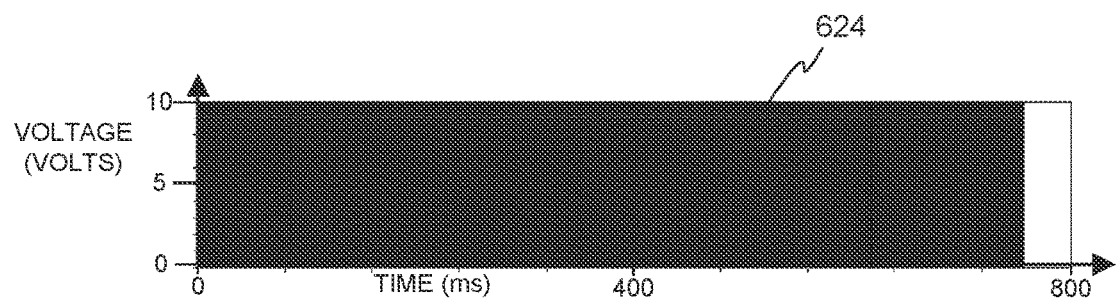

FIGS. 6A-6C illustrate graphs of a spin down simulation showing spin down time and current limit events, in accordance with illustrative aspects of the present disclosure. The simulation of FIGS. 6A-6C was conducted using a spindle motor with +10% Kt. Kt is a torque constant parameter of the spindle motor, and may typically have variation of plus or minus 10% difference in actual torque constant parameter of a manufactured product versus that of the engineering design. Back EMF may be obtained by multiplying Kt by the motor RPM. +10% Kt equates to a worst case scenario of the highest-end variation of very high BEMF and a very high probability of current limit events. FIG. 6A shows a graph of kilorotations per minute (krpm, or RPM/1000) over time of the spindle motor. Curve 602 shows the motor Krpm with spin down conducted using a prior open loop extended park method, and curve 604 shows the motor Krpm with spin down conducted using a closed loop extended park method according to aspects of the present disclosure, in one example. As can be seen in FIG. 6A, curves 602 and 604 are close enough on this scale to substantially overlap, showing that the spin down time may be close to the same for both methods, in this illustrative example. In other examples, methods of this disclosure may implement faster spin down times than for prior art systems.

FIG. 6B shows a graph of voltage over time for current limit events according to an example closed loop extended park control method of the present disclosure, with a scale of 0 to 10 volts on the y axis, and 0 to 800 milliseconds on the x axis. As can be seen, with the exception of one current limit event 614 at the very start of the spin down (almost indistinguishable from the y axis on the scale of this graph), there are no current limit events. FIG. 6C shows a graph of voltage over time for current limit events 624 according to prior open loop extended park control, also with a scale of 0 to 10 volts on the y axis, and 0 to 800 milliseconds on the x axis. As can be seen, current limit events occur virtually constantly for approximately the first 760 ms of the spin down, enough that current over time jumps to maximum and back to zero so often as to appear as a solid block, on the scale of this graph. So, using the closed loop extended park control of the present disclosure, with almost identical spin down times, there are almost no current limit events, in this illustrative example, as compared to nearly constant current limit events over about the first 760 ms of spin down when a typical prior open loop extended park control is used.

Figure 7:
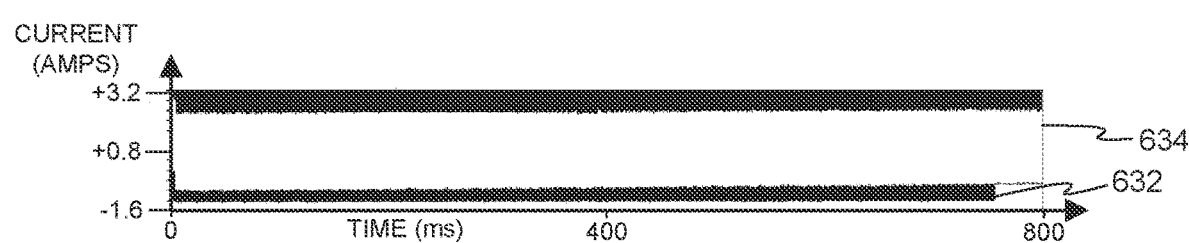
FIG. 7 illustrates another graph of a spin down simulation showing reverse current, according to aspects of the present disclosure.

FIG. 7 illustrates another graph of spin down simulations in different scenarios showing reverse current delivered to the host, showing current over time, with a current range of negative 1.6 to positive 3.2 amps on the y axis, and time from 0 to 800 milliseconds on the x axis, according to aspects of the present disclosure. In particular, the graph of FIG. 7 shows reverse current that occurs with spin down conducted using a closed loop extended park method according to aspects of the present disclosure (I(C6)) in comparison to reverse current that occurs using a prior open loop extended park method (I(C1)). As can be seen in FIG. 7, as a consequence of far fewer current limit events, there is less reverse current 634 flowing through the host using the closed loop extended park method of the present disclosure, relative to the reverse current 632 typical of a prior system. While there is still some reverse current due to the tri-state phase of the duty cycle, the reverse current using the closed loop extended park method of the present disclosure reaches only approximately negative zero point eight amps (−0.8 A), while the reverse current using a prior open loop extended park method reaches approximately negative one point two amps (−1.2 A). This reduced reverse current may promote greater long-term reliability of the disk drive, among other illustrative advantages.

Figure 8:
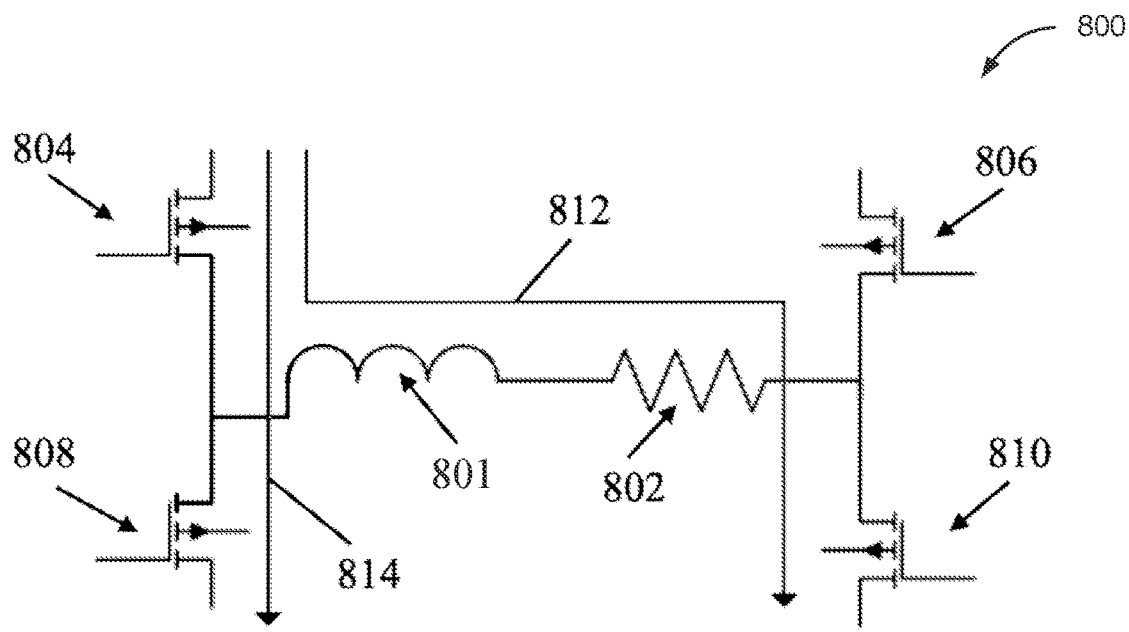
FIG. 8 illustrates a conceptual circuit diagram showing further details of an exemplary voice coil motor in accordance with aspects of the present disclosure.

FIG. 8 illustrates a simplified conceptual circuit diagram showing further details of an illustrative motor circuit 800 in an H-bridge configuration that may be comprised in a VCM (e.g., VCM 20 of FIGS. 2 and 3) in accordance with aspects of the present disclosure. Motor circuit 800 comprises a bridge having inductance and capacitance, conceptually modeled in the view of FIG. 8 as a simple inductor 801 and resistor 802. which are driven by switches (e.g., FETs) 804, 806, 808 and 810; in particular, left high-side switch 804, right high-side switch 806, left low-side switch 808, and right low-side switch 810. Control circuitry (e.g., VCM driver 45 comprised in control circuitry 24) may control switches 804, 806, 808 and 810 to rotate VCM 20 in one direction or another, thereby to actuate the head 22 across a surface of the disk, including toward either the outer diameter (OD) or inner diameter (ID) of the disk.

According to prior open loop extended park methods, as shown by conceptually depicted current flow 812, current may be directed through motor circuit 800 and low right side FET 810 in order to push (park) the head against the OD as well as to draw supply current from the spindle into VCM 20. This supply current may also essentially come from the back EMF of the spindle, and thus current may be drained through VCM 20 as well, in this example. This may help to decrease spin down time and reduce reverse current towards the host, in this example.

According to an illustrative example closed loop extended park method of the present disclosure, control circuitry 24 may shunt current through high left side FET 804 to both left low-side FET 808 and right low-side FET 810 in a load-balancing manner between the two, as shown by conceptually depicted current flows 812 and 814. In this way, control circuitry 24 may ensure more equal current loading between the two low-side FETs 808 and 810, which may help to reduce long-term stresses on FETs 808 and 810 over time, improve reliability of disk drive 15B, and cause less reverse current to the host, in various examples; and reduce spin down times, in some examples. Control circuitry 24 may be configured to load-balance the current shunted through the left and right low-side FETs 808, 810, or other two or more low-side switches in other examples, such as by implementing any method or technique to enable current to flow through both low-side switches, and in some examples, to make at least some effort to divide the current relatively evenly between the two or more low-side switches. In some examples, load-balancing may also include detecting the current through both low-side switches, and implementing a feedback process to react to a greater current in one of the low-side switches by directing at least some of that current, or at least some of the difference in current between the two, to the other low-side switch, to try to balance or reduce the difference in the values of current between the low-side switches.

Figure 9A:
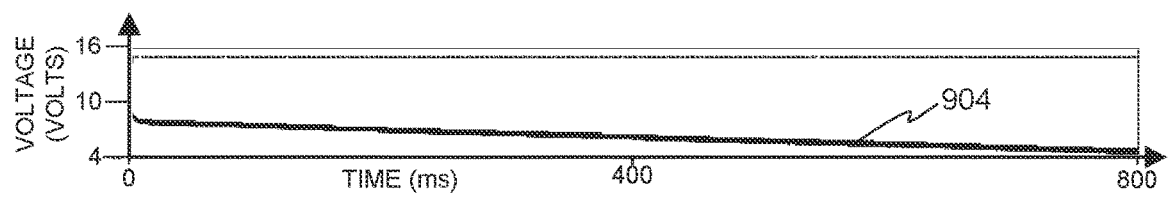
FIGS. 9A-9C illustrate graphs of a spin down simulation according to aspects of the present disclosure, when both the closed loop extended park control and the shunting of current through the high left side and low left side FETs of the VCM are utilized.
Figure 9B:
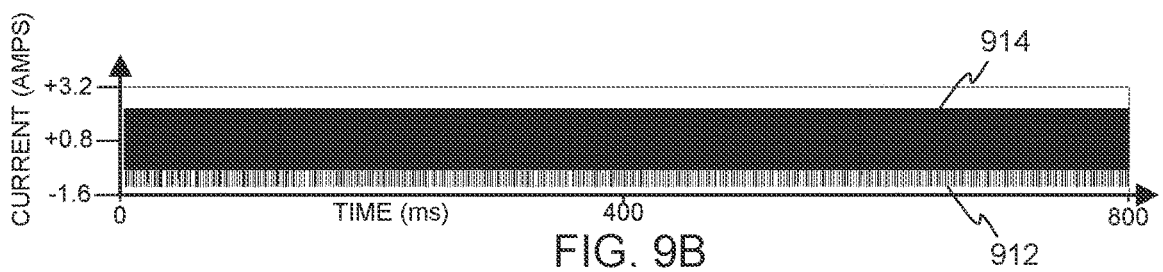
Figure 9C:
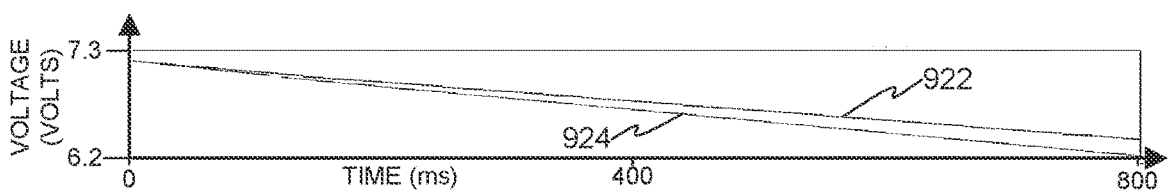

FIGS. 9A-9C illustrate graphs of a spin down simulation according to aspects of the present disclosure, in an example in which control circuitry 24 uses both the closed loop extended park control and the shunting of current through the high left side and low left side FETs of the VCM, as described above. FIG. 9A shows a graph of supply voltage over time, showing a gradual reduction of the supply voltage 904 as controlled by control circuitry 24, in one example. FIG. 9B shows a graph of reverse current over time, with reverse current 914 when control circuitry 24 uses both the closed loop extended park control and the shunting of current through the high left side and low left side FETs of the VCM (I(C6)), which is even further reduced (now approximately negative zero point four amps (−0.4 A)) relative to reverse current 912 (shown overlapping reverse current 914) when prior open loop extended park methods are used (approximately −1.4A). FIG. 9C shows a graph of spin down voltage over time, in which spin down time is faster when control circuitry 24 uses both the closed loop extended park control and the shunting of current through the high left side and low left side FETs of the VCM are used (924) relative to spin down time when prior open loop extended park methods are used (922).

Any suitable control circuitry may be employed to implement the flow diagrams in the above examples, such as any suitable integrated circuit or circuits, including a power large scale integrated (PLSI) circuit. For example, the control circuitry may be implemented within a read channel integrated circuit, or in a component separate from the read channel, such as a data storage controller, or certain operations described above may be performed by a read channel and others by a data storage controller. In one example, the read channel and data storage controller are implemented as separate integrated circuits, and in another example they are fabricated into a single integrated circuit or system on a chip (SoC). In addition, the control circuitry may include a suitable preamp circuit implemented as a separate integrated circuit, integrated into the read channel or data storage controller circuit, or integrated into an SoC.

In one example, the control circuitry comprises a microprocessor executing instructions, the instructions being operable to cause the microprocessor to perform the flow diagrams described herein. The instructions may be stored in any computer-readable medium. In various examples, the instructions may be stored on a non-volatile semiconductor memory device, component, or system external to the microprocessor, or integrated with the microprocessor in an SoC. In another example, the instructions are stored on the disk and read into a volatile semiconductor memory when the disk drive is powered on. In yet another example, the control circuitry comprises suitable logic circuitry, such as state machine circuitry. In some examples, at least some of the flow diagram blocks may be implemented using analog circuitry (e.g., analog comparators, timers, etc.), and in other examples at least some of the blocks may be implemented using digital circuitry or a combination of analog and digital circuitry.

In various examples, the control circuitry, or other one or more processing devices performing one or more of the functions of control circuitry as described herein, may be abstracted away from being physically proximate to the disks and disk surfaces. The control circuitry, or other one or more processing devices performing one or more of the functions of control circuitry as described herein, may be part of or proximate to a rack of or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. In addition, some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 500 and other methods of this disclosure may include other steps or variations in various other examples. Some or all of any of method 500 may be performed by or embodied in hardware, and/or performed or executed by a controller, a CPU, an FPGA, a SoC, a PLSI, a multiprocessor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device comprising:
a spindle motor configured to rotate one or more disks; and
one or more processing devices configured to:
   determine a value of current that is discharged from the spindle motor over time during a spin down of the spindle motor;
   control a braking duty cycle for braking the spindle motor during the spin down such that the value of current discharged from the spindle motor over time does not exceed a selected current limit; and
   control the braking duty cycle such that the value of current discharged through the spindle motor over time remains at or below a maximum current rating of the spindle motor.

2. A data storage device comprising:
a spindle motor configured to rotate one or more disks; and
one or more processing devices configured to:
   determine a value of current that is discharged from the spindle motor over time during a spin down of the spindle motor;
   control a braking duty cycle for braking the spindle motor during the spin down such that the value of current discharged from the spindle motor over time does not exceed a selected current limit; and
   set the selected current limit at a value below a maximum current rating of the spindle motor.

3. The data storage device of claim 2, wherein the maximum current rating of the spindle motor is approximately 3 amps, and the one or more processing devices are further configured to set the selected current limit at a value that is less than 3 amps.

4. A data storage comprising:
a spindle motor configured to rotate one or more disks; and
one or more processing devices configured to:
   determine a value of current that is discharged from the spindle motor over time during a spin down of the spindle motor; and
   control a braking duty cycle for braking the spindle motor during the spin down such that the value of current discharged from the spindle motor over time does not exceed a selected current limit,
wherein the current discharged from the spindle motor is discharged through one or more low-side switches of the spindle motor, and
wherein determining the value of current discharged from the spindle motor comprises determining a value of current through the one or more low-side switches of the spindle motor.

5. The data storage device of claim 4, wherein the one or more processing devices are further configured to use a feedback loop to set the braking duty cycle, the feedback loop comprising a proportional integral controller configured to modify the braking duty cycle based on feedback of the determined value of current through the one or more low-side switches of the spindle motor, such that the current through the one or more low-side switches remains at or below the selected current limit of the spindle motor.

6. A data storage device comprising:
a spindle motor configured to rotate one or more disks;
a voice coil motor (VCM) that comprises left and right low-side switches; and
one or more processing devices configured to:
   determine a value of current that is discharged from the spindle motor over time during a spin down of the spindle motor;
   control a braking duty cycle for braking the spindle motor during the spin down such that the value of current discharged from the spindle motor over time does not exceed a selected current limit; and
   shunt a portion of the current discharged from the spindle motor during a spin down of the spindle motor through both the left and right low-side switches comprised in the VCM.

7. The data storage device of claim 6, wherein the one or more processing devices are further configured to load-balance the portion of the current shunted through the left and right low-side switches.

8. A method comprising:
determining, by one or more processing devices, a value of current that is discharged from a spindle motor of a data storage device over time during a spin down of the spindle motor; and
controlling, by the one or more processing devices, a braking duty cycle for braking the spindle motor during the spin down such that the value of current discharged from the spindle motor over time does not exceed a selected current limit; and
shunting a portion of the current discharged from the spindle motor during a spin down of the spindle motor through both left and right low-side switches comprised in a voice coil motor (VCM) of the data storage device.

9. The method of claim 8, further comprising:
controlling the braking duty cycle such that the value of current discharged through the spindle motor over time remains at or below a maximum current rating of the spindle motor.

10. The method of claim 8, further comprising
setting the selected current limit at a value below a maximum current rating of the spindle motor.

11. The method of claim 10, wherein the maximum current rating of the spindle motor is approximately 3 amps, the method further comprising setting the selected current limit at a value that is less than 3 amps.

12. The method of claim 8
wherein the current discharged from the spindle motor is discharged through one or more low-side switches of the spindle motor, and
wherein determining the value of current discharged from the spindle motor comprises determining a value of current through the one or more low-side switches of the spindle motor.

13. The method of claim 12, further comprising using a feedback loop to set the braking duty cycle, the feedback loop comprising a proportional integral controller configured to modify the braking duty cycle based on feedback of the determined value of current through the one or more low-side switches of the spindle motor, such that the current through the one or more low-side switches remains at or below the selected current limit of the spindle motor.

14. The method of claim 8, further comprising load-balancing the portion of the current shunted through the left and right low-side switches.

15. One or more processing devices comprising:
means for determining a value of current that is discharged from a spindle motor of a data storage device over time during a spin down of the spindle motor;
means for controlling a braking duty cycle for braking the spindle motor during the spin down such that the value of current discharged from the spindle motor over time does not exceed a selected current limit; and means for controlling the braking duty cycle such that the value of current discharged through the spindle motor over time remains at or below a maximum current rating of the spindle motor.

16. The one or more processing devices of claim 15,
wherein the current discharged from the spindle motor is discharged through one or more low-side switches of the spindle motor, and wherein determining the value of current discharged from the spindle motor comprises determining a value of current through the one or more low-side switches of the spindle motor.

17. The one or more processing devices of claim 15, further comprising means for shunting a portion of the current discharged from the spindle motor during a spin down of the spindle motor through both left and right low-side switches comprised in a voice coil motor (VCM) of the data storage device.

* * * * *